Aug. 16, 1938.　　J. H. VICTOR ET AL　　2,127,372
COATED ALL-METAL GASKET
Filed March 8, 1935

JOHN H. VICTOR
BENJAMIN J. VICTOR
INVENTORS

PER Albert J Fihe
ATTORNEY

Patented Aug. 16, 1938

2,127,372

UNITED STATES PATENT OFFICE 2,127,372

COATED ALL-METAL GASKET

John H. Victor, Wilmette, and Benjamin J. Victor, Oak Park, Ill., assignors to Victor Manufacturing & Gasket Company, Chicago, Ill., a corporation of Illinois Application March 8, 1935, Serial No. 10,055

1 Claim. (Cl. 288—1)

This invention relates to improvements in coated all-metal gaskets, particularly gaskets used in connection with the cylinder heads of internal combustion engines, especially those of the high compression type.

One of the important objects of this invention is to provide a gasket for an internal combustion engine of the high compression type which shall last as long as the motor and which can be removed and replaced from time to time whenever repairs on the motor become necessary and without affecting the properties of the gasket in any way.

Another important object of the invention is to provide a gasket which shall be completely proof against burning or blowing out even at the most vulnerable points such as the openings between the combustion chambers and which further can be used on either aluminum or cast iron heads or on any other combustion head with complete safety and entire reliability.

A still further important object of the invention is the provision in an all-metal gasket of means for efficiently cooling those portions of the gasket which are most subject to heat or burning whereby the life of the same will be indefinitely prolonged. Another object is to provide a metal which, while being relatively soft and having a relatively low melting point, has a high heat conductivity which will render it eminently suitable for work of this type.

Another and further important object of the invention is the provision of an all-metal gasket which can be die-cast or otherwise produced from a suitable metal or alloy which, on account of its nature, should be somewhat soft or resilient, while, at the same time, sufficiently resistant to heat. In order to protect those portions of the gasket more exposed to high temperatures, a reinforcement of some harder or better heat-resistant material may be incorporated, during the die-casting or other forming operation, into the material of the gasket itself.

A still further important object of the invention is to provide, in an all-metal gasket of the class described, means for insuring a positive and accurate contact of the gasket between the motor block and the cylinder head, especially at those points where a gas and liquid tight contact is especially necessary and desirable, by coating both surfaces with a pliable, heat-resisting non-sticking material.

Another object is the protection of water holes whereby adequate cooling and proper contacts at these important points is insured.

The gasket of this invention constitutes an improvement over prior Patent No. 1,932,539 granted to one of the joint inventors herein, namely Benjamin J. Victor, on October 31, 1933.

Other and further important objects of the invention will be apparent from the disclosures in the accompanying drawing and following specification.

The invention, in a preferred form, is illustrated in the drawing and hereinafter more fully described.

Figure 1:
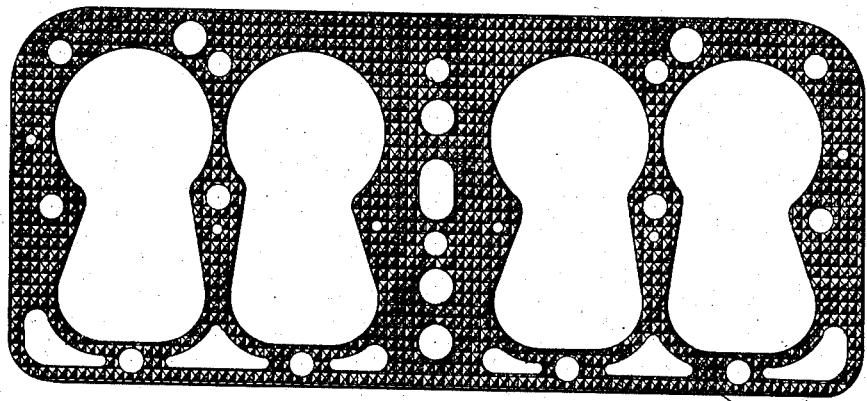
Figure 1 is a plan view of an improved gasket made in accordance with this invention.

The reference numeral 13 indicates generally a gasket for the cylinder head of an internal combustion engine, and in this particular embodiment of the invention, the gasket is composed entirely of metal, preferably some metal having a high heat conductivity and possibly, although not necessarily, a low melting point with, however, a certain resiliency and desired softness and toughness, and it has been discovered that these qualities and their combinations are best found in a gasket composed of an aluminum alloy.

Figure 3:
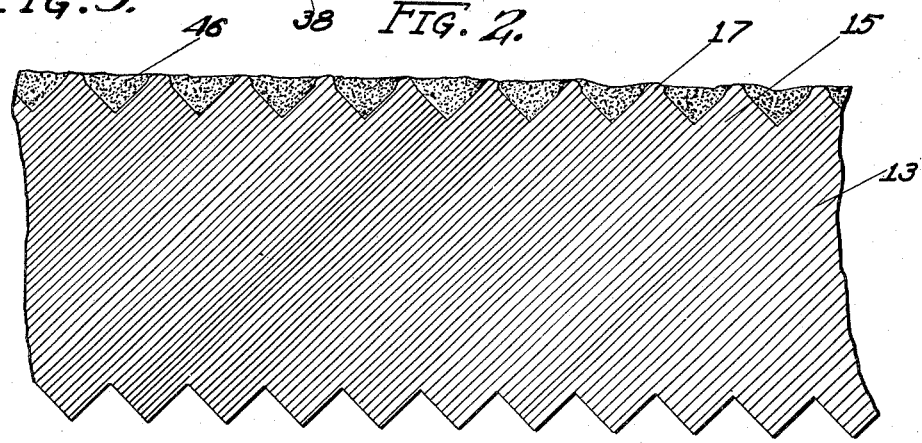
Figure 3 is a greatly enlarged sectional view of one of the gaskets.

As best shown at 15 in Figure 3, the surface of the metal adjacent the cylinder openings and adjacent the water holes, and also at any other desired places is knurled, corrugated or scored to form a means of better contact between these parts and the corresponding surfaces of the cylinder block and head. This eliminates any tendency to leakage, blow-outs, or the like. These corrugations can be incorporated into the gasket when it is made or afterwards. For example, if the gasket is die-cast, the configurations may be in the mold, while if the gasket is made of a sheet of metal stamped or cut, the corrugations can be impressed at that time, or in the sheet itself before stamping out the gasket.

Figures 2, 5:
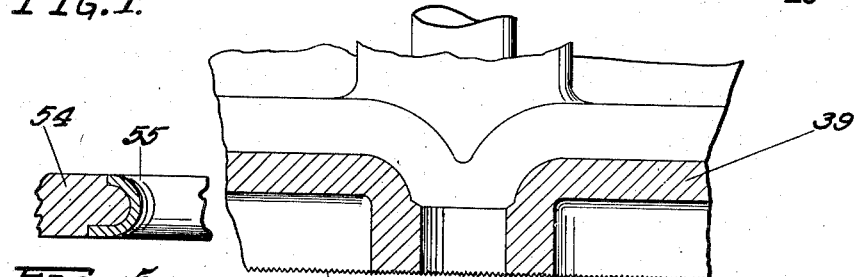
Figure 2 illustrates a modification.
Figure 5 shows a still further modification of the invention.

In die-casting, the edges of the cylinder openings and also other openings may be reinforced with steel flanges or with flanges of some other metal as nichrome. As best shown in Figure 5, the gasket may be of die-cast material as at 54 and have reinforced combustion and other edges 55 which are made of a tougher metal. Also, the gasket itself can be made of alloys other than aluminum as, for example, copper or a copper alloy, a soft steel plate or alloys of iron and the like which can be later carbonized and hardened to a desired degree. The ideal gasket would be one composed of metal having the same coefficient of expansion as the material of the cylinder head and block, so that changes in working temperatures would not affect the relationship between the gasket and the adjacent parts.

The gasket need not necessarily be shaped along its outer edges to conform to the exterior dimensions of the head and block as it may be made over-size, if desired, as the extending portions would then act as a fin for cooling or for carrying off of heat. Further, the gasket need not be made solid, but could have portions cut away or openings left therein at various points so as to produce a lighter construction, if desired or necessary.

Figure 4:
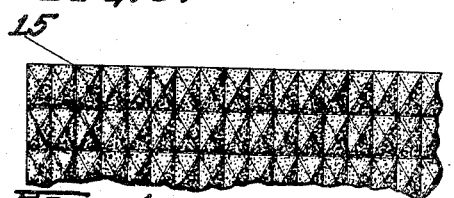
Figure 4 is an enlarged partial plan view.

Additionally, the surface of the gasket 13 on one or both faces can be completely covered with indentations, knurling or corrugations as shown at 15 in Figures 1 and 4, which, in addition to forming a better contact with adjacent parts of the motor, could also be filled with some sort of a coating or filler as shown at 46 in Figure 3 so as to make a better seal for water and compression. Such indentations and corresponding high points will tend more readily to adjust themselves to minute irregularities in the motor head and block and form a better seal. This filler may be a resin or a digested hydrocarbon, such as elaterite.

Further, the gasket can be made of variable thickness, those portions of the gasket around the combustion chambers and water openings can preferably be made heavier or thicker than the remaining portions as in Figure 5 or these portions may be made with integral or added built-up flanges so as to produce a better seal and more intimate contact over these areas.

Such a gasket may be employed on a motor with provisions made in the motor head and block such as grooves or channels which would conform to corresponding grooves in the gasket. The head 38 itself could also be knurled as shown at 38 in Figure 2, leaving the material of the head to conform by such knurlings or corrugations to the opposed surface of the block.

In all-metal gaskets of this type, the surfaces must be corrugated or indented in some way, as shown at 15 in Figures 1, 3 and 4, and these corrugations or indentations must have some coating thereon in order to provide a perfect seal.

As best shown at 46 in Figure 3, this coating, which may be of digested elaterite or some other resilient organic material, works its way into the depressions between the ridges 15, and upon application of the gasket between the cylinder head and block, or between any other adjacent parts of a mechanism, the resilient coating is squeezed down into the depressions, allowing the high or sharp points of the protuberances 15 to contact the metal of the adjacent elements. These points are then either pressed down or distorted slightly as shown at 17 in Figure 3, whereupon the desired intimate contact between the parts results, and a non-leaking seal is provided.

The temperature of cylinder head gaskets seldom exceeds 200° F., at least over the major portion of the area. Organic materials such as herein described have shown themselves useful for coating all-metal gaskets of this type and also for filling the crevices in the indentations 38 such as may be formed in a cylinder head or the like 38 as shown in Figure 2, but it has been found that, at the usual operating temperatures in internal combustion engines, materials having a desirable plastic nature will become somewhat sticky or tacky, and it is proposed to remedy this situation by dusting the finished surface with ground vermiculite, powdered metal or the like.

As best shown in Figure 3, the filling 16 is to be flush with the upper ends 17 of the metal projections 15 so that, as the gasket wears down or is compressed, there will always be, in addition to the metal to metal contact, a cushion of the remaining material which also contacts with the metal of the cylinder head block or adjacent element.

Another advantage of this surface treatment of an all-metal gasket is that the surface will show little, if any, metal, but becomes more of a metal surface as the packing shows signs of wearing due to compression or vibrations of the motor or from rubbing due to unequal expansion of the various metals composing the gasket, cylinder head block, or the like.

We are aware that many changes may be made and numerous details of construction varied throughout a wide range without departing from the principles of this invention, and we, therefore, do not purpose limiting the patent granted hereon otherwise than as necessitated by the prior art.

We claim as our invention:

A gasket for internal combustion engines composed of a single unitary sheet of metal having indentations therein, and a thin coating over the faces of the gasket, said coating composed of digested elaterite.

JOHN H. VICTOR.
BENJAMIN J. VICTOR.